(12) United States Patent
Irani

(10) Patent No.: US 7,348,562 B2
(45) Date of Patent: Mar. 25, 2008

(54) METHOD FOR ADAPTING AN EXISTING THERMAL IMAGING DEVICE

(75) Inventor: Keikhosrow Irani, Franklin Lakes, NJ (US)

(73) Assignee: Mikron Infrared, Inc., Oakland, NJ (US)

( * ) Notice: Subject to any disclaimer, the term of this patent is extended or adjusted under 35 U.S.C. 154(b) by 0 days.

(21) Appl. No.: 10/536,541

(22) PCT Filed: Feb. 2, 2004

(86) PCT No.: PCT/US2004/002762

§ 371 (c)(1),
(2), (4) Date: May 26, 2005

(87) PCT Pub. No.: WO2004/069547

PCT Pub. Date: Aug. 19, 2004

(65) Prior Publication Data

US 2006/0049352 A1    Mar. 9, 2006

(51) Int. Cl.
*G01J 5/02* (2006.01)

(52) U.S. Cl. ................................. 250/339.02

(58) Field of Classification Search .......... 250/339.01, 250/339.02, 339.04, 330, 332, 338.1, 338.4, 250/352

See application file for complete search history.

(56) References Cited

U.S. PATENT DOCUMENTS

| | | | |
|---|---|---|---|
| 4,257,106 A * | 3/1981 | Auer ........................ | 250/338.1 |
| 4,495,416 A | 1/1985 | Mason et al. | |
| 4,594,507 A * | 6/1986 | Elliott et al. ................. | 250/331 |
| 4,940,895 A * | 7/1990 | Mansfield .................... | 250/332 |
| RE33,857 E * | 3/1992 | Ariessohn et al. .......... | 348/164 |
| 5,144,149 A * | 9/1992 | Frosch ..................... | 250/493.1 |
| 5,248,884 A * | 9/1993 | Brewitt-Taylor et al. ........................ | 250/338.4 |
| 5,268,576 A * | 12/1993 | Dudley ....................... | 250/332 |
| 5,396,068 A * | 3/1995 | Bethea ........................ | 250/330 |
| 5,463,222 A * | 10/1995 | Lesko et al. ................. | 250/330 |
| 5,600,139 A * | 2/1997 | Mladjan et al. ............. | 250/330 |
| 5,675,149 A * | 10/1997 | Wood et al. ................. | 250/332 |
| 5,737,119 A * | 4/1998 | Mladjan et al. ............. | 359/353 |
| 6,133,569 A * | 10/2000 | Shoda et al. ................. | 250/332 |

(Continued)

FOREIGN PATENT DOCUMENTS

EP    1 174 836 A2    1/2002

*Primary Examiner*—David Porta
*Assistant Examiner*—Faye Boosalis
(74) *Attorney, Agent, or Firm*—W. Patrick Quast

(57) ABSTRACT

A method for adapting existing thermal imaging devices employing uncooled focal plane arrays (UFPA) for thermal imaging of target surfaces, the device including a housing (12) with an opening (14) for directing incident infrared rays along an optical path through an optical assembly (40) optimized to have a spectral band width of 3 to 14 um, onto a UFPA detector (48) having a spectral transmission window (84) which has a bandwidth 3 to 14 um sufficient to pass all infrared rays of interest over a broad temperature range. Filter means (44) including at least two filters (78, 80), having a band width in the ranges of 3 to 8 um and 8 to 14 um, respectively, allow for the placement of either specialized IR filter in the optical path so as to attenuate and/or pass certain wavelengths of the infrared rays depending on the specific application in a broad range between −40° C. to 2000° C. The device allows for thermal imaging even in daytime applications in sunlight.

5 Claims, 18 Drawing Sheets

U.S. PATENT DOCUMENTS

| | | | | |
|---|---|---|---|---|
| 6,144,031 | A * | 11/2000 | Herring et al. | 250/352 |
| 6,255,650 | B1 * | 7/2001 | Warner et al. | 250/330 |
| 6,276,144 | B1 * | 8/2001 | Marland et al. | 62/51.1 |
| 6,456,261 | B1 * | 9/2002 | Zhang | 345/8 |
| 6,486,473 | B2 * | 11/2002 | Salapow et al. | 250/330 |
| 6,515,285 | B1 * | 2/2003 | Marshall et al. | 250/352 |
| 6,630,670 | B2 * | 10/2003 | Salisbury et al. | 250/330 |
| 6,649,912 | B2 * | 11/2003 | Salapow et al. | 250/330 |
| 2002/0030162 | A1 * | 3/2002 | Salisbury et al. | 250/330 |
| 2004/0129881 | A1 * | 7/2004 | Hamrelius et al. | 250/330 |

* cited by examiner

TABLE 1

| Temp °C | ENERGY Watts/cm^2 | Temp °C | ENERGY Watts/cm^2 | |
|---|---|---|---|---|
| 400 | 3.4701E-02 | 850 | 3.2282E-01 | |
| 410 | 3.7613E-02 | 860 | 3.3269E-01 | |
| 420 | 4.0675E-02 | 870 | 3.4271E-01 | |
| 430 | 4.3891E-02 | 880 | 3.5285E-01 | |
| 440 | 4.7261E-02 | 890 | 3.6313E-01 | |
| 450 | 5.0787E-02 | 900 | 3.7353E-01 | ◄—— 104 |
| 460 | 5.4471E-02 | 910 | 3.8406E-01 | |
| 470 | 5.8314E-02 | 920 | 3.9472E-01 | |
| 480 | 6.2318E-02 | 930 | 4.0550E-01 | |
| 490 | 6.6483E-02 | 940 | 4.1641E-01 | |
| 500 | 7.0809E-02 | 950 | 4.2744E-01 | |
| 510 | 7.5299E-02 | 960 | 4.3859E-01 | |
| 520 | 7.9952E-02 | 970 | 4.4985E-01 | |
| 530 | 8.4769E-02 | 980 | 4.6124E-01 | |
| 540 | 8.9749E-02 | 990 | 4.7274E-01 | |
| 550 | 9.4894E-02 | 1000 | 4.8436E-01 | |
| 560 | 1.0020E-01 | 1010 | 4.9609E-01 | |
| 570 | 1.0568E-01 | 1020 | 5.0793E-01 | |
| 580 | 1.1131E-01 | 1030 | 5.1988E-01 | |
| 590 | 1.1711E-01 | 1040 | 5.3194E-01 | |
| 600 | 1.2308E-01 | 1050 | 5.4411E-01 | |
| 610 | 1.2921E-01 | 1060 | 5.5639E-01 | |
| 620 | 1.3550E-01 | 1070 | 5.6877E-01 | |
| 630 | 1.4195E-01 | 1080 | 5.8126E-01 | |
| 640 | 1.4856E-01 | 1090 | 5.9385E-01 | |
| 650 | 1.5533E-01 | 1100 | 6.0654E-01 | ◄—— 106 |
| 660 | 1.6226E-01 | 1110 | 6.1933E-01 | |
| 670 | 1.6935E-01 | 1120 | 6.3222E-01 | |
| 680 | 1.7660E-01 | 1130 | 6.4521E-01 | |
| 690 | 1.8401E-01 | 1140 | 6.5829E-01 | |
| 700 | 1.9157E-01 | 1150 | 6.7147E-01 | |
| 710 | 1.9928E-01 | 1160 | 6.8475E-01 | |
| 720 | 2.0715E-01 | 1170 | 6.9812E-01 | |
| 730 | 2.1517E-01 | 1180 | 7.1157E-01 | |
| 740 | 2.2334E-01 | 1190 | 7.2512E-01 | |
| 750 | 2.3166E-01 | 1200 | 7.3876E-01 | |
| 760 | 2.4013E-01 | 1210 | 7.5249E-01 | |
| 770 | 2.4875E-01 | 1220 | 7.6631E-01 | |
| 780 | 2.5751E-01 | 1230 | 7.8021E-01 | |
| 790 | 2.6642E-01 | 1240 | 7.9419E-01 | |
| 800 | 2.7547E-01 | 1250 | 8.0826E-01 | |
| 810 | 2.8466E-01 | 1260 | 8.2242E-01 | |
| 820 | 2.9399E-01 | 1270 | 8.3665E-01 | |
| 830 | 3.0346E-01 | 1280 | 8.5097E-01 | |
| 840 | 3.1307E-01 | 1290 | 8.6536E-01 | |
|  |  | 1300 | 8.7984E-01 | |

FIGURE 11A

TABLE 1 (con't)

| Temp °C | ENERGY Watts/cm^2 | Temp °C | ENERGY Watts/cm^2 |
|---|---|---|---|
| 1310 | 8.9439E-01 | 1780 | 1.6506E+00 |
| 1320 | 9.0902E-01 | 1790 | 1.6679E+00 |
| 1330 | 9.2373E-01 | 1800 | 1.6853E+00 |
| 1340 | 9.3851E-01 | 1810 | 1.7028E+00 |
| 1350 | 9.5336E-01 | 1820 | 1.7202E+00 |
| 1360 | 9.6829E-01 | 1830 | 1.7378E+00 |
| 1370 | 9.8329E-01 | 1840 | 1.7553E+00 |
| 1380 | 9.9836E-01 | 1850 | 1.7729E+00 |
| 1390 | 1.0135E+00 | 1860 | 1.7906E+00 |
| 1400 | 1.0287E+00 | 1870 | 1.8082E+00 |
| 1410 | 1.0440E+00 | 1880 | 1.8259E+00 |
| 1420 | 1.0593E+00 | 1890 | 1.8437E+00 |
| 1430 | 1.0748E+00 | 1900 | 1.8615E+00 |
| 1440 | 1.0902E+00 | 1910 | 1.8793E+00 |
| 1450 | 1.1058E+00 | 1920 | 1.8972E+00 |
| 1460 | 1.1214E+00 | 1930 | 1.9151E+00 |
| 1470 | 1.1371E+00 | 1940 | 1.9330E+00 |
| 1480 | 1.1528E+00 | 1950 | 1.9510E+00 |
| 1490 | 1.1686E+00 | 1960 | 1.9690E+00 |
| 1500 | 1.1845E+00 | 1970 | 1.9871E+00 |
| 1510 | 1.2004E+00 | 1980 | 2.0051E+00 |
| 1520 | 1.2163E+00 | 1990 | 2.0233E+00 |
| 1530 | 1.2324E+00 | 2000 | 2.0414E+00 |
| 1540 | 1.2485E+00 | | |
| 1550 | 1.2646E+00 | | |
| 1560 | 1.2809E+00 | | |
| 1570 | 1.2971E+00 | | |
| 1580 | 1.3134E+00 | | |
| 1590 | 1.3298E+00 | | |
| 1600 | 1.3463E+00 | | |
| 1610 | 1.3627E+00 | | |
| 1620 | 1.3793E+00 | | |
| 1630 | 1.3959E+00 | | |
| 1640 | 1.4125E+00 | | |
| 1650 | 1.4292E+00 | | |
| 1660 | 1.4459E+00 | | |
| 1670 | 1.4627E+00 | | |
| 1680 | 1.4796E+00 | | |
| 1690 | 1.4965E+00 | | |
| 1700 | 1.5134E+00 ◄──── 108 | | |
| 1710 | 1.5304E+00 | | |
| 1720 | 1.5474E+00 | | |
| 1730 | 1.5645E+00 | | |
| 1740 | 1.5816E+00 | | |
| 1750 | 1.5988E+00 | | |
| 1760 | 1.6160E+00 | | |
| 1770 | 1.6333E+00 | | |

FIGURE 11B

TABLE 2

| Temp °C | ENERGY Watts/cm^2 | Temp °C | ENERGY Watts/cm^2 | Temp °C | ENERGY Watts/cm^2 |
|---|---|---|---|---|---|
| 900 | 3.7353E-01 | 944 | 4.2081E-01 | 988 | 4.7043E-01 |
| 901 | 3.7458E-01 | 945 | 4.2191E-01 | 989 | 4.7159E-01 |
| 902 | 3.7563E-01 | 946 | 4.2301E-01 | 990 | 4.7274E-01 |
| 903 | 3.7668E-01 | 947 | 4.2412E-01 | 991 | 4.7390E-01 |
| 904 | 3.7773E-01 | 948 | 4.2522E-01 | 992 | 4.7506E-01 |
| 905 | 3.7878E-01 | 949 | 4.2633E-01 | 993 | 4.7621E-01 |
| 906 | 3.7984E-01 | 950 | 4.2744E-01 | 994 | 4.7737E-01 |
| 907 | 3.8089E-01 | 951 | 4.2855E-01 | 995 | 4.7853E-01 |
| 908 | 3.8195E-01 | 952 | 4.2966E-01 | 996 | 4.7970E-01 |
| 909 | 3.8301E-01 | 953 | 4.3077E-01 | 997 | 4.8086E-01 |
| 910 | 3.8406E-01 | 954 | 4.3188E-01 | 998 | 4.8202E-01 |
| 911 | 3.8512E-01 | 955 | 4.3300E-01 | 999 | 4.8319E-01 |
| 912 | 3.8619E-01 | 956 | 4.3411E-01 | 1000 | 4.8436E-01 |
| 913 | 3.8725E-01 | 957 | 4.3523E-01 | | |
| 914 | 3.8831E-01 | 958 | 4.3635E-01 | | |
| 915 | 3.8938E-01 | 959 | 4.3747E-01 | | |
| 916 | 3.9044E-01 | 960 | 4.3859E-01 | | |
| 917 | 3.9151E-01 | 961 | 4.3971E-01 | | |
| 918 | 3.9258E-01 | 962 | 4.4083E-01 | | |
| 919 | 3.9365E-01 | 963 | 4.4195E-01 | | |
| 920 | 3.9472E-01 | 964 | 4.4308E-01 | | |
| 921 | 3.9579E-01 | 965 | 4.4421E-01 | | |
| 922 | 3.9687E-01 | 966 | 4.4533E-01 | | |
| 923 | 3.9794E-01 ← 110 | 967 | 4.4646E-01 | | |
| 924 | 3.9902E-01 | 968 | 4.4759E-01 | | |
| 925 | 4.0010E-01 | 969 | 4.4872E-01 | | |
| 926 | 4.0118E-01 | 970 | 4.4985E-01 | | |
| 927 | 4.0226E-01 | 971 | 4.5099E-01 ← 112 | | |
| 928 | 4.0334E-01 | 972 | 4.5212E-01 | | |
| 929 | 4.0442E-01 | 973 | 4.5326E-01 | | |
| 930 | 4.0550E-01 | 974 | 4.5439E-01 | | |
| 931 | 4.0659E-01 | 975 | 4.5553E-01 | | |
| 932 | 4.0768E-01 | 976 | 4.5667E-01 | | |
| 933 | 4.0876E-01 | 977 | 4.5781E-01 | | |
| 934 | 4.0985E-01 | 978 | 4.5895E-01 | | |
| 935 | 4.1094E-01 | 979 | 4.6010E-01 | | |
| 936 | 4.1203E-01 | 980 | 4.6124E-01 | | |
| 937 | 4.1313E-01 | 981 | 4.6238E-01 | | |
| 938 | 4.1422E-01 | 982 | 4.6353E-01 | | |
| 939 | 4.1531E-01 | 983 | 4.6468E-01 | | |
| 940 | 4.1641E-01 | 984 | 4.6583E-01 | | |
| 941 | 4.1751E-01 | 985 | 4.6698E-01 | | |
| 942 | 4.1861E-01 | 986 | 4.6813E-01 | | |
| 943 | 4.1971E-01 | 987 | 4.6928E-01 | | |

FIGURE 12

METHOD FOR ADAPTING AN EXISTING THERMAL IMAGING DEVICE

FIELD OF THE INVENTION

This invention relates to a method for adapting existing thermal imaging devices employing uncooled focal plane arrays (UFPA) which heretofore have been used to take temperature measurements associated with conventional, predictive preventive maintenance PPM applications involved with an industrial process, or otherwise at the facility, so as now to enable these devices to provide thermal imaging in unique situations, for example the thermal imaging of the wall surface of tubes used in direct-fired processes, such as refineries and power plants.

BACKGROUND

There are classes of applications in petrochemical and power utility industries that involve the thermal imaging and absolute temperature measurement of wall-tube surfaces in direct fired process heaters under production conditions. The temperature range in these processes varies from 400 to 1200° C. It is widely recognized that operation of furnace tubes above their creep-rupture design temperature, for example in ethylene plants, results in diminished lifetimes and increases the prospects for premature failures. Any failure of the tubes results in very expensive repair costs and furnace shut downs.

In addition, temperatures often adversely affect productivity or yield of desired product. For example a 10° C. temperature difference from desired temperature at the coil output of a large ethylene plant can result in hundreds of thousands of dollars of revenue loss per year. Such a loss is caused by a less than desired conversion of the feedstock. The same thing applies to coker furnaces in refineries. When operating at a slightly higher temperature than optimum, overcaking and increased coke formation inside of the tubes results. This causes higher outside temperature, and consequently reduced through puts. Formation of coking inside tubes and identifying the exact location of this formation is most important. Large uncertainties in the tube surface temperatures are unacceptable if the process is to operate under nearly optimized conditions with any degree of confidence.

Power utilities are becoming more cost conscious as the result of deregulation. Much of the same principles detailed above apply to utilities' furnaces. In a coal fired utility furnace, for example, identifying clinker formation inside the boiler tubes is as important as identifying coke formation in petrochemical cracking furnaces.

The industry's techniques for the furnace tube temperature measurement have improved through the years and there exist three methods at the present time for this measurement.

The first method utilizes a thermocouple with direct physical contact, such as welding to the tubes in select locations. However, thermocouple installations are unreliable for extended operation because of the rapid drift in their calibration; and, deterioration of the protective materials in the furnace atmosphere. In addition the number of thermocouples installed is limited due to the complexity which results in the associated wiring and instrumentation. Normally distances of 100 meters and longer are necessary to reach the control room. It is nearly impossible to identify the exact location of tube coking by the thermocouple method.

A second method, which is widely used in many plants employs portable, single point radiation thermometers with appropriate optics, spatial resolution and infrared filtering. These instruments have the ability to correct for the effects of in-furnace conditions such as emissivity, reflected irradiance and furnace gas emission/absorptions on the indicated radiation thermometer readings (see literature for Mikron model M90D and Mikron/Quantum Logic model I, both manufactured by Mikron Infrared, Inc. of Oakland, N.J., (hereinafter "Mikron", "Assignee" and/or "Applicant") for more details). In the Mikron/Quantum Logic I a novel method of using a modulated laser permits measuring the emissivity of the tube, allowing more precise temperature measurement of the tube.

These conventional, single point, portable radiation thermometers have one serious shortcoming, i.e., it is nearly impossible to expect someone to measure all the tubes across the entire length or height of the furnace. The number of measurements can easily reach hundreds per furnace per day. Operator fatigue and boredom will eventually result in the deterioration of the quality of the reported data. Consequently the process engineers choose only select points for measurement and ignore the rest of them. Thus, the identification of locations where coke formation takes place, becomes more a matter of chance than a certainty.

The third method presently employed uses a thermal imaging instrument with a sufficient field of view to observe a very large portion of the interior of furnace. FIG. 1 shows a cross section of a typical coker furnace in a refinery. The fields of view 1, 3, 5 for different imager positions 7, 9, 11 are depicted. A sufficient number of viewports 13, 15 are available in order to image a substantial if not all of the interior of the furnace. These mid-wavelength, infrared (MWIR) instruments include a suitable infrared filter which allows the imager to "see" through a substantial depth of hot combustion gases 17. A typical infrared filter is a narrow pass band filter centered at 3.90 um. Flame combustion by-products include gases such as $H_2O$, $N_2$, $CO_2$, and $NO_x$, and a small residue of ashes and other particles. These hot combustion gases emit a substantial amount of radiation toward the wall tubes 19 resulting in heating the tubes. It is known that at 3.90 um there is a void in the spectrum of hot gases radiation (see FIGS. 2A and 2B) that makes the hot gases very transparent. An instrument operating at this particular wavelength where the target is absorptive and thus emissive, can provide a very high quality thermal image of the interior of the furnace even in the presence of hot combustion gases.

In addition by estimating or knowing the emissivity of the tubes and furnace background temperature for calculation of tube reflected irradiance, one can get adequate repeatability. The sensitivity of the thermal imagers is quite good such that differences of 1-2° C. can be easily discerned. However, the matter of establishing absolute temperature levels on tubes is quite another matter.

Modern thermal imagers have the ability to store the images taken in the field for further off-line image processing. A number of useful parameters and in particular temperature profile/time trend analysis can be readily determined. The trend of wall tube temperature in most cases can effectively be used as an indication of the expected life of the tubes or formation of coke inside of the tubes, either one of which having a substantial effect on the productivity of the process and the over all cost of operation of the plant.

Present State of the Art in Thermal Imaging

The existing thermal imagers designed with an appropriate infrared band pass filter of 3.9 um for penetration through hot combustion gases rely on photon detectors such as Indium Antimonite (InSb), Mercury Cadmium Telluride (MCT), Platinum Silicide (PtS) or Quantum Well Infrared Photo-detector (QWIP). A typical detector has an array of 320H×240V elements (pixels) to form a thermal image and are very sensitive in the spectral band of 3 to 5 um. The main shortcoming of this class of detector is that they have to operate at very low cryogenic temperatures, such as 77K, which is equivalent to the temperature of liquid nitrogen.

To achieve cryogenic temperatures for a portable instrument demands a very high-tech cryocooler, which operates on the same principles as a house refrigerator, except that helium gas or other very low temperature liquid gas is used as the medium of compression. In addition to the initial manufacturing costs, incorporating a cryocooler compressor into a portable instrument has other shortcomings. Firstly, in order for a cryocooler to reach sufficiently low cryogenic temperatures it takes several minutes. Second of all, a cryocooler has many moving and sealing parts such as piston, cylinder, gaskets, o-rings and motor. The piston, cylinder, gaskets and o-rings seals must operate under very high pressure, in order to convert gas to liquid. The typical life of a cryocooler is about 2000 hours. A normal failure mode is the leaking of helium gas through the seals. The replacement or repair of a cryocooler can exceed 25% of the initial cost of buying the instrument. Besides being costly, repairs normally are associated with long delays due either to spare parts' shortages or the limited number of repair people with the necessary level of expertise. Further, the battery life is mostly consumed in keeping the detector cooled. Normally operators must carry an external high capacity battery, either strapped over the shoulder, or belted around the waist. This adds to the inconvenience and poses a threat to the safety of the operators, since operators must image the interior of these furnaces from narrow catwalks through hot view ports several stories high. Of course, the avoidance of injuries during this operation is of paramount importance to plant management.

Further, these photon detectors are effectively limited, again, to the spectral band of 3 to 5 um. As such, they are not useful in detecting "lower" temperatures, for example, in the range of −40 to 200° C., and particularly outdoors, during the day, in sunlight, which, due to the influence of the sun, a powerful source of radiation energy at 3 to 5 um, precludes their use. These lower temperatures can occur at other points in petrochemical-related processes and can also be very critical. Monitoring of these conditions is usually accomplished using a long wave infrared (LWIR) imaging radiometer operating in the 8-14 um spectral bands.

Also, ancillary furnace and other facility functions can be the subject of a comprehensive predictive and preventive maintenance (PPM) program requiring a similar low temperature, detection capability.

Thus the present state of the art requires the use of two instruments to cover the broad temperature range of −40 to 2000° C. for two distinctly different applications, such as coker furnaces and PPM activities.

In the last several years a class of un-cooled focal plane array (UFPA) infrared detectors has been introduced to the commercial market for numerous industrial, scientific, security, public safety, automotive and fire fighting applications. The impetus for the design and development of these modern detectors was the need by the military for a light, highly potable night vision device. The main advantage of UFPA detectors is that they can operate at room temperature. There is no need for a cryogenic environment to cool down the detectors.

However all these detectors are optimized to operate for the longer wavelengths of the infrared spectrum, normally beyond 6 um. The detector is vacuum-sealed for optimum performance by an infrared transmitting window covering the sensitive sensing elements (pixels). The infrared transmission characteristic of this window is from 6 to 14 um or 8 to 14 um. The spectral transmission of 8 to 14 um is preferred choice, since the effect of atmospheric absorption band is minimized, thus allowing greater clarity of images at longer distances.

It is a primary object of this invention to provide for a new use for these UFPA devices by adapting them in a way that permits them to be used as MWIR devices in addition, so that they are able to measure the high temperature of target surfaces, for example the tube walls inside a furnace without the interference from combustion flames, as well as functioning in low temperature ranges, including detecting temperatures in broad daylight.

It is a further object of the present invention to provide a portable lightweight instrument which does not require cooling to cryogenic temperatures thereby prolonging instrument battery life thereby providing additional convenience and safety that is very desirable in such environments.

A still further object is to adapt existing UFPA thermal imaging devices so as to accomplish the purposes of the present invention, the device including built-in firmware and associated off-line software, for example, MikroSpec™ off-line software, to further enhance the degree of accuracy of the measurement, allowing for further temperature/time trend analysis which can for example prolong the life of the tubes and thus the productivity of plant operation, or provide other benefits when used with different processes.

SUMMARY OF THE INVENTION

Towards the accomplishment of these and other objectives and advantages which will become apparent from a reading of this specification taken together with the accompanying drawings there is provided a method for adapting existing thermal imaging devices used in low temperature applications so as to be able to determine the temperature of target surface(s) having different temperatures within a range of temperatures of interest between a high and low temperature of −40° C. to 2000° C. The thermal imaging takes place through intervening media having a known transmission wavelength. The target surface(s) have a known absorptive wavelength.

The device comprises a housing including an opening for admitting infrared rays including those emanating from the target surface(s). The rays are directed along an optical path within the housing. The optical path has an optical axis.

An optical assembly is positioned within the housing and in the optical path. The optical assembly has an input and an output. The infrared rays are directed towards and into the input, through and out of the output of the optical assembly.

Means for optimizing the spectral band width of the optical assembly to 3 um to 14 um are provided. In the preferred embodiment, the optical assembly includes an objective lens, a negative lens, and focusing lens means. In the preferred embodiment, each of the lenses is made of germanium. In the preferred embodiment, each lens has an anti-reflection coating with a spectral band width of 3 um to 14 um.

There is also present an un-cooled focal plane array, infrared ray detector (UFPA detector) which includes a detecting surface. The UFPA detector is positioned in the housing and in the optical path so as to allow the impingement of the infrared rays passing out of the optical assembly onto the detecting surface.

Means for optimizing the spectral band width of the UFPA detector to 3 um to 14 um are employed. In the preferred embodiment, this includes a spectral transmission window positioned in the optical path between the output of the optical assembly and the UFPA detecting surface, with the spectral transmission window having a spectral band width of 3 um to 14 um. Typically the transmission window is made part of the UFPA detector.

The UFPA detector provides an electrical output proportional to the energy of the infrared rays impinging onto the detecting surface;

Filter means including a first and second infrared band pass filter are provided. The first infrared band pass filter has a spectral band width of 8 to 14 um. The second infrared band pass filter has a respective spectral band width falling within the band of 3 to 8 um. Each of the band pass filters is removably interposed in the optical path upon direction of an operator for filtering the infrared rays entering the housing so as to attenuate certain infrared rays and to pass other infrared rays of particular, respective predetermined wavelengths associated with the range of temperatures of interest, the transmission wavelength of the intervening media and the absorptive wavelength of the target surface(s).

Electronic means are provided which are adapted to convert the electrical output of the UFPA detector into at least one interpretable output whereby an operator is presented with information sufficient to determine the temperature(s) of the target surface(s) within an acceptable degree of accuracy.

The device allows for the thermal imaging of PPM type applications to occur in sunlight when said first infrared band pass filter is interposed in the optical path.

In one application of the device, the spectral band width of the second band pass filter is 3.8 to 4.0 um.

In another application of the device, the spectral band width of the second band pass filter is 4.8 to 5.2 um.

In still another application of the device the spectral band width of the second band pass filter is 6.7 to 6.9 um.

BRIEF DESCRIPTION OF THE DRAWINGS

Other objects and advantages will become apparent from the following description when read alone and/or taken together with the accompanying drawings which include:

FIGS. 11A and 11B depicting in Table form the determination of the temperature, in 10° C. increments, of a blackbody using Planck's law for different incident radiant energy at wavelengths of 3.8 um to 4.0 um; and, FIG. 12 depicting in Table form the determination of the temperature, in 1° C. increments between 900 and 1000° C., of a blackbody using Planck's law for different incident radiant energy at wavelengths of 3.8 um to 4.0 um.

DESCRIPTION OF THE PREFERRED EMBODIMENT

Figure 3:
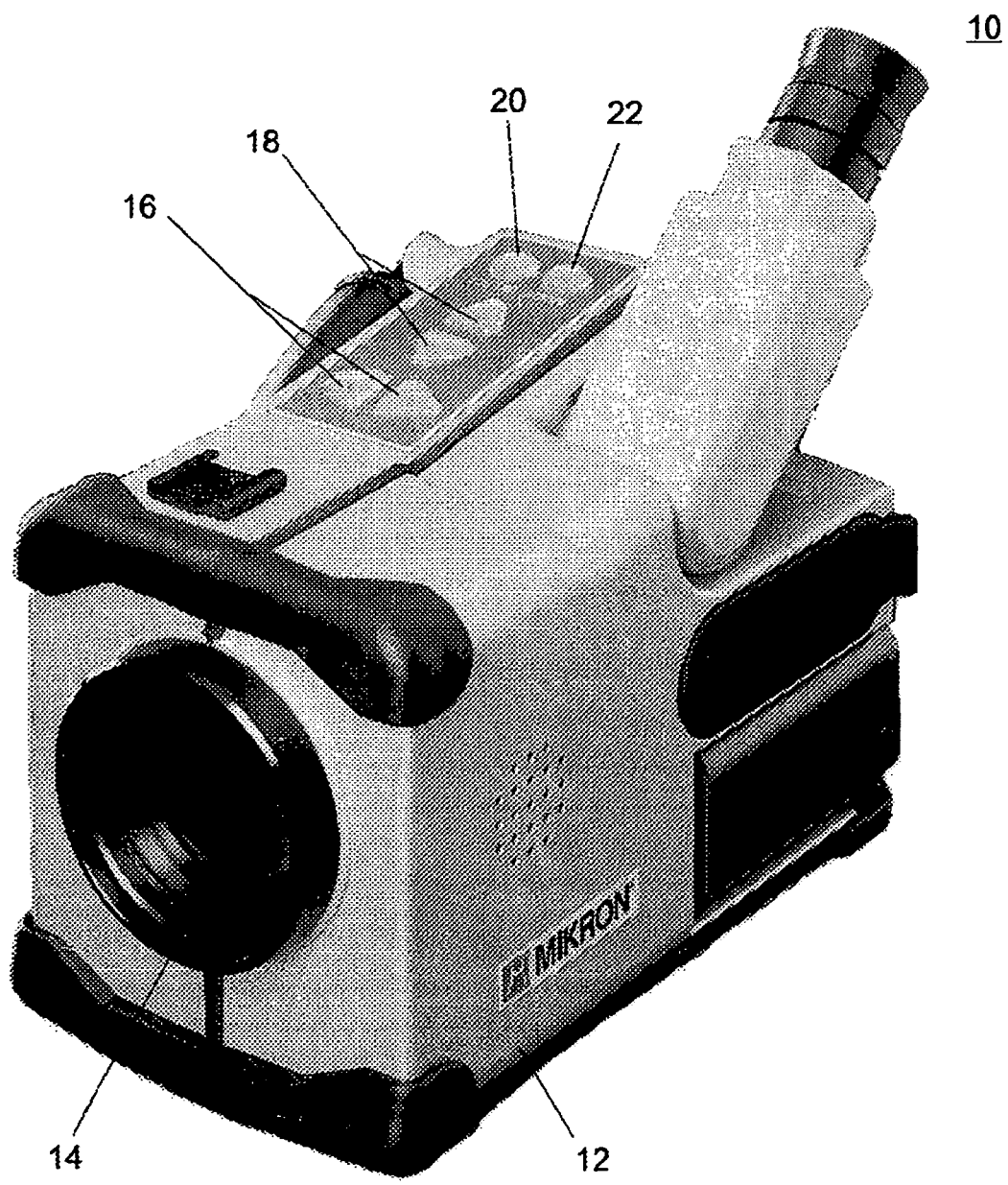
FIGS. 3, 3A and 3B showing different perspective views of a modified model 7200V thermal imager of the assignee and applicant with all necessary design changes to implement the present invention.
Figure 3A:
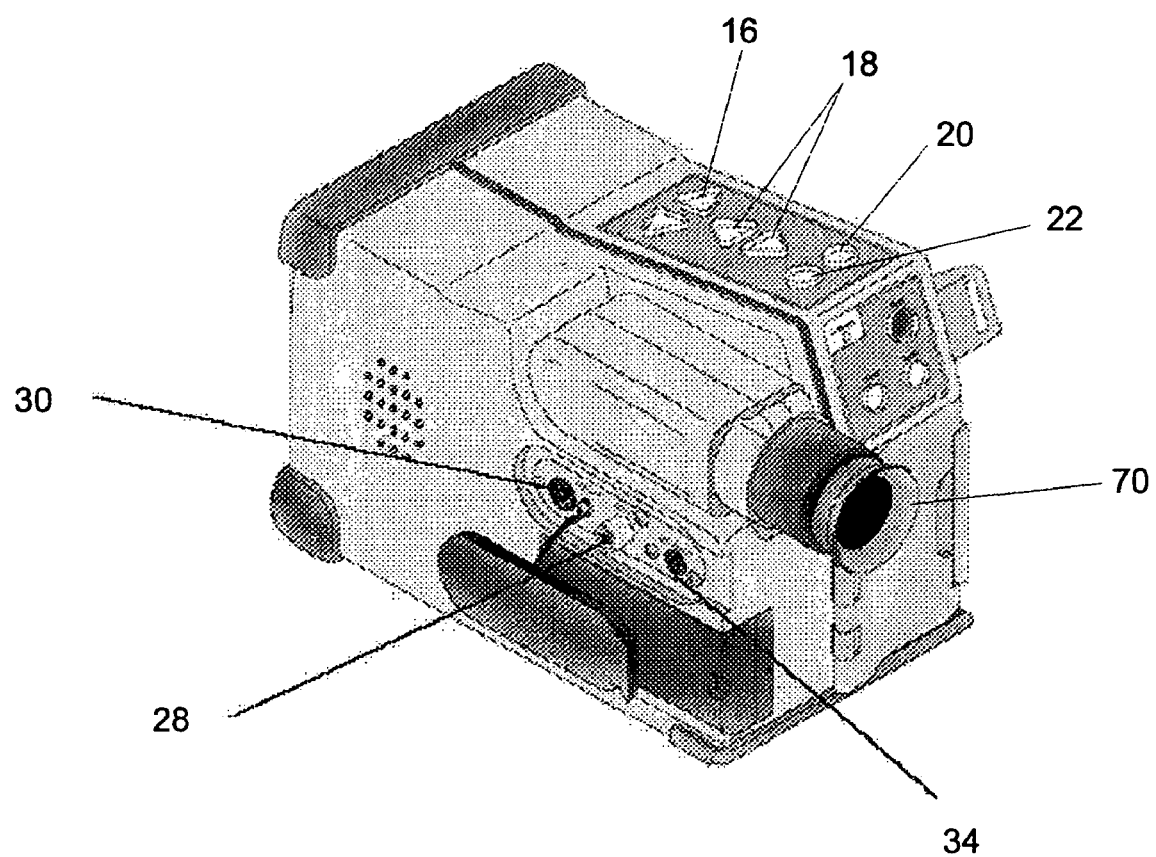
Figure 3B:
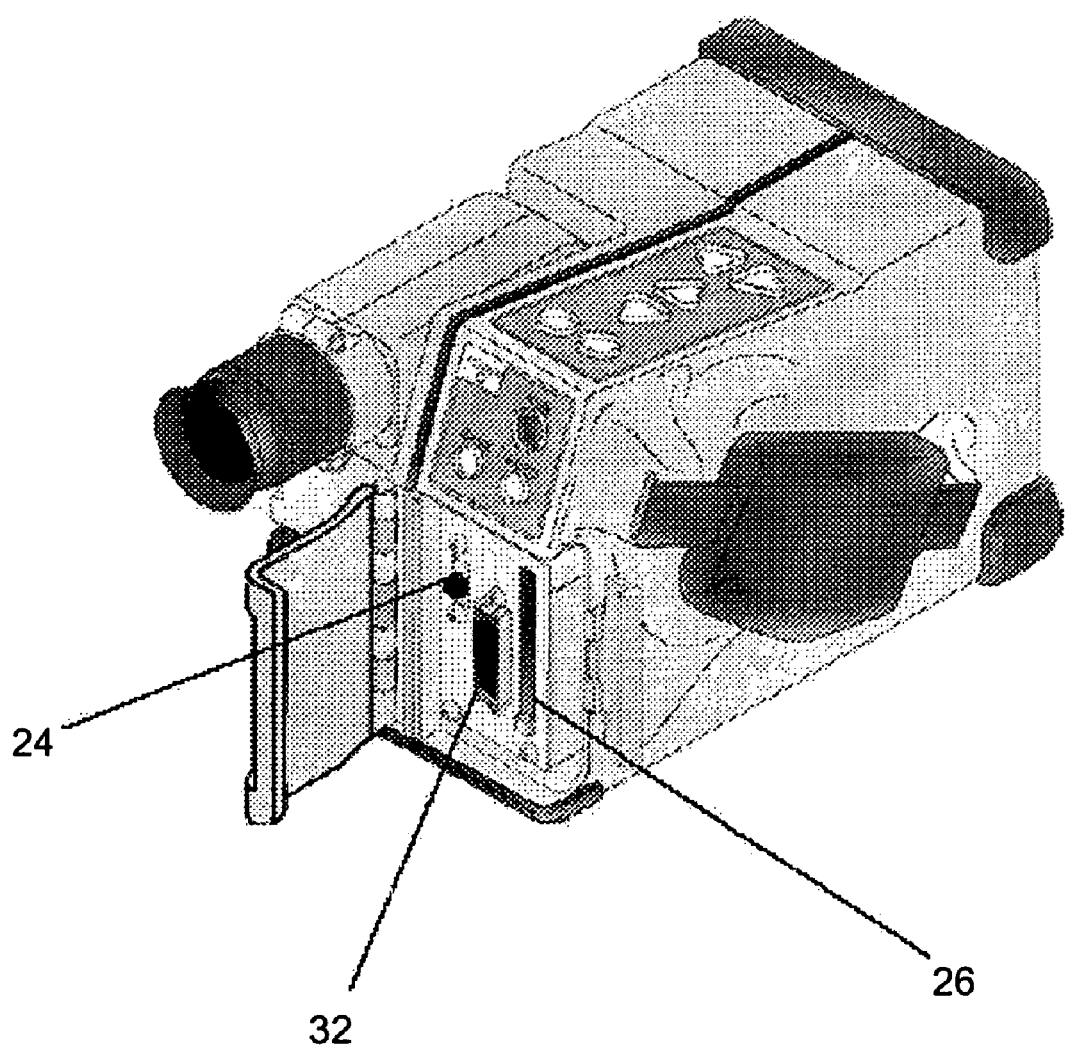

Referring now to the drawings wherein the same reference numbers are used in various figures to identify the same item, in FIGS. 3, 3A and 3B, a version of the Assignee's (Applicant's) Model 7200V, thermal imager modified to implement the present invention is depicted. The improved device for thermal imaging of target surfaces includes a housing 12 having an opening 14 through which the infrared rays emanating from the target surface(s) are received. The improved device is an extremely light weight high-performance, IR camera which is designed for comfortable, one-handed point-and-shot operation. It uses an intuitive key pad located on the top of the imager which includes cursor controls 16, focus controls 18, menu selection key 20 and mode selection key 22. The menu selection key 20 allows the operator to identify the temperature range to be viewed.

Battery power is supplied upon activation of power switch 24 (FIG. 3B). Memory card slot means 26 is provided to enable the storage of images and data to PCMCIA cards for subsequent review. Images can also be viewed in real time via the video outputs 28 and/or 30 (which is a RS-232C S-video output) and/or through an optional built-in IEEE 1394 FireWire® interface, 32. Since the camera is battery operated provision of course is made for use of an adapter at plug 34 for continuous AC operation.

The MicroScan 7200V comes standard with extensive on board image processing software. It also can be remotely controlled from a PC using optional software also available through the Assignee, which provides additional analysis and reporting capabilities. Such software is marketed by the present Assignee under its trademark MikroSpec. The MikroSpec™ real-time thermal data acquisition and analysis software is a windows-based software program that offers high-speed; real-time data acquisition and image analysis capabilities. By using one or more infrared cameras connected to the software, processes can be measured accurately to insure production quality. The software allows the user to view thermal images in real-time as well as those that have been captured and stored to the computer's hard-disc drive. The software allows the creation of numerous regions of interests in various shapes so that details can be retrieved as to the temperature range within the regions of interest.

Figure 4:
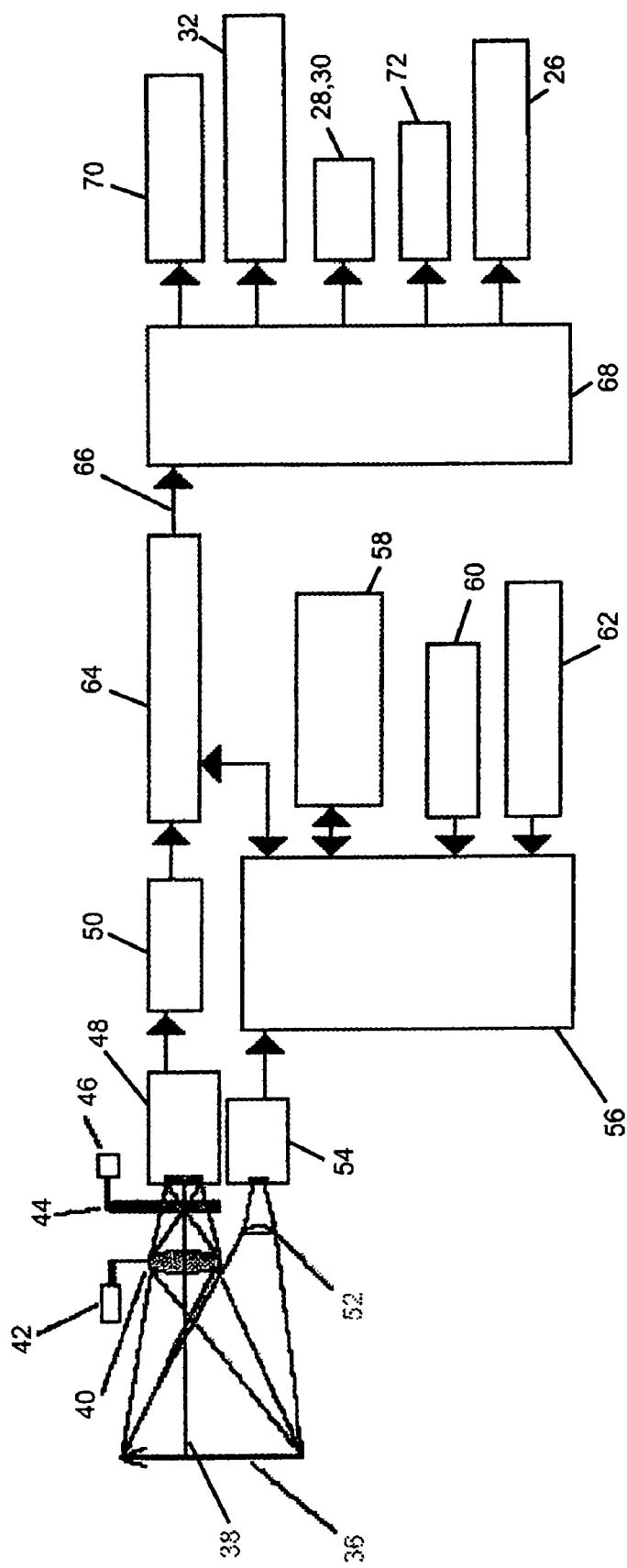
FIG. 4 depicts in functional schematic form various elements of the thermal imager of the present invention.

Referring now to FIG. 4, the thermal imaging device of the present invention is depicted functionally. Infrared radiation received at opening 14 comprises radiation emanating from target 36, radiation from other sources in the vicinity of the target and radiation reflected from the target due to other sources in its vicinity. The infrared radiation arrives at the opening 14 of the imaging device where it is directed along an optical path within the imaging device having an optical access 38. Positioned in the optical path and centered about the optical access is an infrared, optical assembly 40. The received IR radiation is directed into, through and out of the optical assembly which includes a focus control means 42 which, as noted hereafter, can be either manually or motor driven. As functionally depicted, the rays emanating from the optical assembly 40 are directed through a filter arrangement having at least two positions so as to interpose filters of different band widths consistent with the purposes of the invention and a respective application. The stepper motor 46 enables the operator to position the filter 44 at the different positions as he needs to, in response to the temperature range choice effected by key 20 and corresponding selection.

The infrared optics assembly 40, as noted collects the infrared energy from the target, that is the energy within the field of view of the instrument and focuses that energy onto an un-cooled focal plane array, infrared ray detector (UFPA detector) 48. The UFPA detector is a typical application consists of 320H×240V elements which are sensitive to infrared energy. The UFPA detector 48 provides an electrical output which is proportional to the energy of the infrared rays impinging on its detecting surface. This output is supplied to a pre-amp 50 for amplification of the minute changes sensed by the UFPA detector elements in response to the impinging rays.

Parallel with the infrared optics, is a visible optic assembly 52. This collects the visible portion of the electromagnetic spectrum originating from the target so as to create a visible image of the target which is recognizable by the user. The output of the visible optic assembly 52 is fed through a digital converting module 54 which in turn is fed to the CPU module 56.

The CPU unit arranges, manages, receives or sends all necessary instruction to perform the various tasks required, for example, the change for different temperature ranges initiated by menu selection key 20. Some of the interactions with the CPU 56 include a microphone/speaker attachment 58 to record an operator's voice memo for playback at a latter time; the interface with the key pad keys, for example the menu select key 20; and a battery check feature 62 for monitoring the remaining capacity of the battery source to provide an early warning to the operator. In addition the CPU module 56 interacts with a signal processing component 64 which receives the signal from the pre-amp 50.

The signal processing unit 64 contains a necessary algorithm(s) and/or look up tables (see hereinafter with respect to Equations 1, 2, 3 and 4 and FIGS. 11A, 11B and 12) for conversion of the incoming energy determinations to actual temperature equivalents.

The output 66 of the signal processing unit is supplied to the IF module which converts the output of the signal processor to different types of recognizable outputs including, for example, a thermal image through the viewfinder 70 (see FIGS. 9A, 9B, and 10); recognizable digital outputs for communication to a PC through the GP-IB/FireWire® 32; an analog video signal which can be fed directly to a video monitor; and/or RS232C 30 which is reserved for communication with the internal signal processing unit, 64 and the CPU unit, 56 for firmware up-dating, modifications and calibration. Further the IF module can provide an output 72 for an optional color video display (not shown) attached to the imager. Still further IF module 68 can provide, through the memory card slot 26, a capability of inserting a PCMCIA which allows the detected images to be recorded for later viewing and analysis.

In order to achieve the objective of this invention, the optical design plays an important role. In the preferred embodiment, the quality of the image has to be maintained over the very wide spectral band of 3 to 14 um, instead of a conventional optical assembly design used in present thermal imagers that optimizes either over the spectral band of 8 to 14 um or 3 to 5 um. The broader band width includes optics for the desirable spectral band centered at 3.9 um for high temperature measurement that can see through a substantial depth of hot combustion gases encountered in furnaces, and the 8 to 14 um range that allows the thermal imaging of low temperature objects in associated processes and predictive and preventive maintenance applications, even, most significantly, during daytime and outdoors when sun is present.

Figure 5:
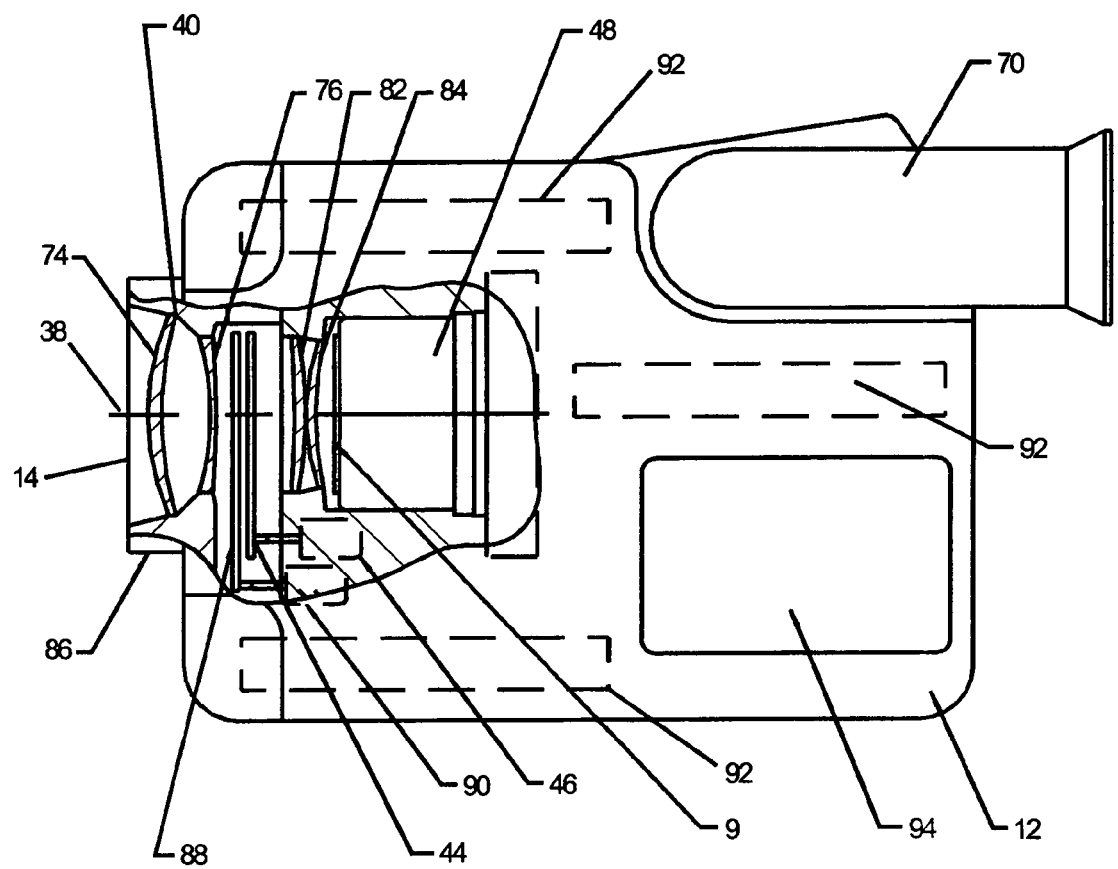
FIG. 5 depicting in a side elevational, partially sectional, functional view of various elements which comprise the present invention.

Referring to FIG. 5, the preferred embodiment of the present invention includes the optical assembly 40 that has a very wide-band, spectrally flat, anti-reflection coating between 3 to 14 um. The optical assembly comprises 4 lenses.

Lens 74 is an objective lens made from germanium material and optically coated for high transmission in the spectrum band range of 3 to 14 um. The ray bundle from the target located any distance from 12" (30 cm) to 200 FT (60 m), strikes lens 74 and after some diffraction will be projected into lens 76.

Lens 76 is a negative lens made from germanium and optically coated for a spectral band of 3 to 14 um. The bundle of rays striking the lens 76 will emerge from lens 76 more parallel to the optical axis 38. This feature allows the placement of the infrared filter assembly 44 behind the lens 76 with a minimum of shift of the critical narrow band associated with the center wavelength of the infrared filter to be interposed in the optical path as discussed hereinafter.

Figure 6:
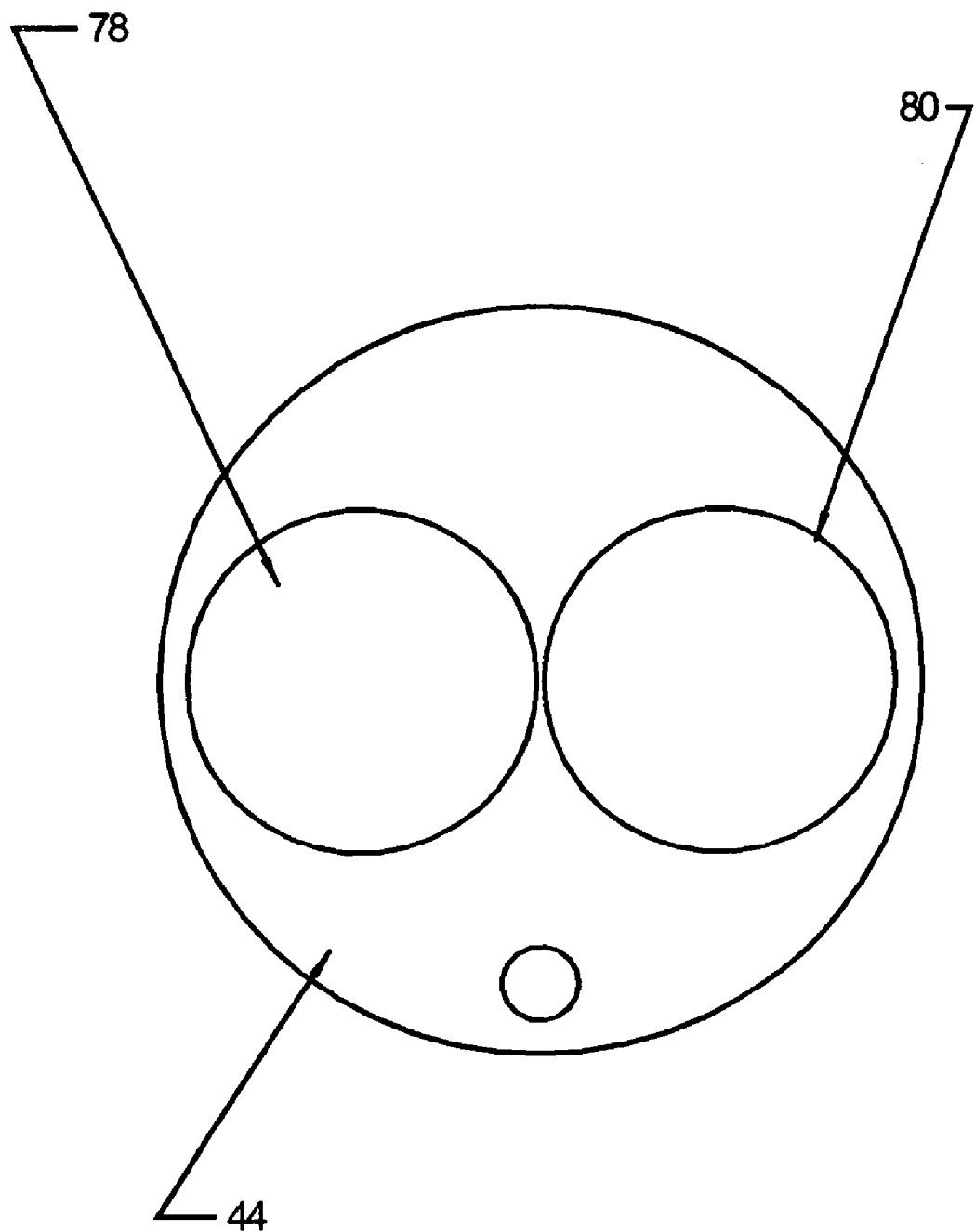
FIG. 6 depicting a two position, IR filter assembly of the present invention.

The IR filter assembly mount 44 has in this embodiment two positions, either of which is automatically selected by the associated microprocessor CPU 56 inside the thermal imager in response to menu key 20 and the temperature range selected. Referring to FIG. 6, at position 78, an IR filter with a spectral band width of 8 to 14 um, for low temperature thermal imaging, is inserted in the optical path. At position 80, a second infrared filter having a narrow pass band centered, in the preferred embodiment, at approximately 3.9 um and having a band width of 0.2 um, for high temperature thermal imaging, is inserted in the optical path.

Focusing lenses 82 and 84 combine to allow the bundle of rays emerging from the selected IR filter to be focused onto sensitive elements of the un-cooled focal plane array (UFPA) detector 48. The precise focusing is achieved by moving the combination of lenses 82 and 84 toward or away from lens 76. The focusing, for example, can be achieved in the Mikron thermal imager of 7200V or 7515 manually or automatically through activation of focus keys 18.

A protective ring 86 houses a window to protect the objective lens 74. This serves to protect the thermal imager in very harsh environments, as for example, the blowing heat and particles which may be experienced at the view port of large utility furnaces. The ring can be unscrewed to allow other accessories such as a telephoto or wide angle lens assembly to be attached to the front of the imager.

At position 78 of the filter assembly 44 shown in FIG. 6, an infrared filter with a spectral band width of 8 to 14 um allows for low temperature thermal imaging in the range typically between −40 to 500° C. This measurement is minimally affected due to absorption by the atmosphere, and allows for long distance thermal imaging and is unaffected by the presence of sun in outdoor applications.

Figure 2A:
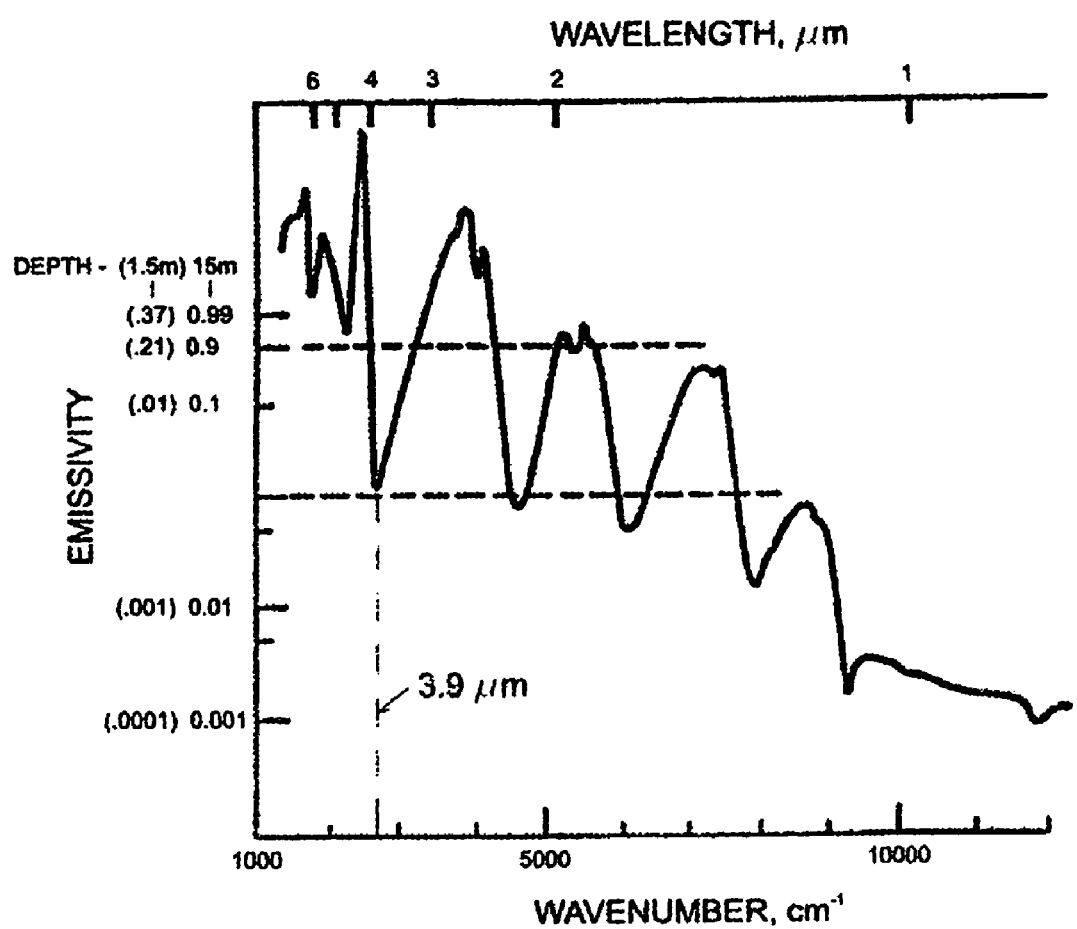
FIG. 2A depicting in graph form, the spectral emissivity of combustion gases versus wavelength in um and wave number in $cm^{-1}$.
Figure 2B:
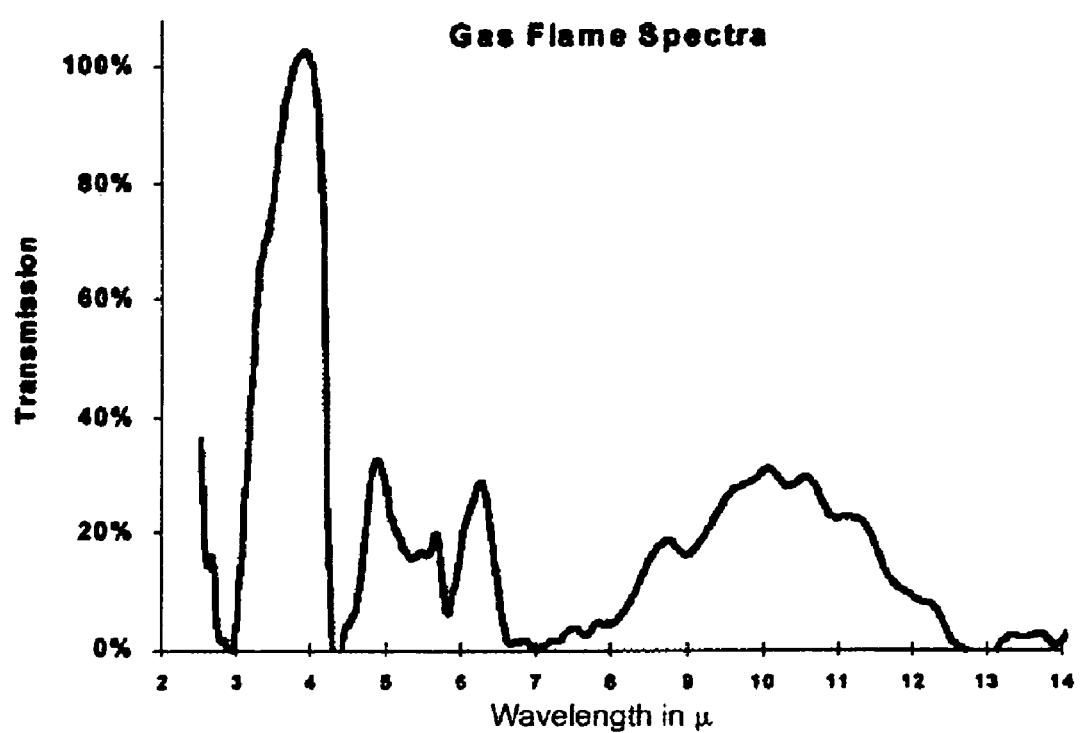
FIG. 2B depicting in graph form, the typical transmission spectra of combustion flame in percentage versus wavelength in μ.

In position 80, the present invention introduces a very narrow band infrared filter centered at a wavelength which depends on the presence of any intervening media and/or the absorptive wavelength range of the targeted surface. As can be seen from the graphs in FIGS. 2A and 2B, an infrared filter centered about the 3.9 um wavelength, superimposed on spectral emissivity of hot combustion (flue) gases, avoids the absorption band of hot combustion gases, a by-product of fossil fuel burning. That is, the combustion gases are transparent at this wavelength. The band width centered at the 3.9 um wavelength is 0.2 um. Consequently, thermal images of wall tubes inside of petrochemical and utility furnaces can be provided. An accurate temperature profile of these wall tubes can be obtained with the application of a proper algorithm (Equations 1 and 2, see hereinafter). A typical temperature range for the thermal imager with this filter in place, is 400 to 2000° C.

A stepper motor 46 under control of the microprocessor (CPU) 56 in electronics 92, will position the infrared filters 78 or 80 in front of the detector 48 as dictated by the operator via the select (menu) 20 as shown in FIG. 3.

Figure 7A:
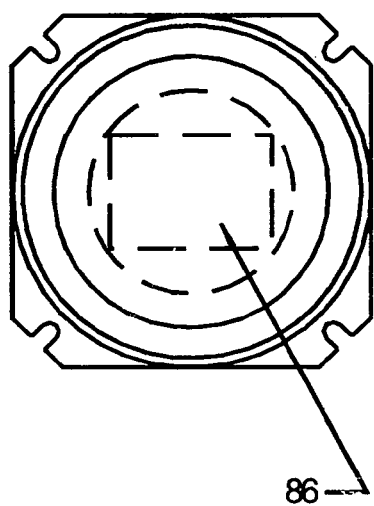
FIG. 7A depicting in front elevational view the UFPA detector used in the present invention.
Figure 7B:
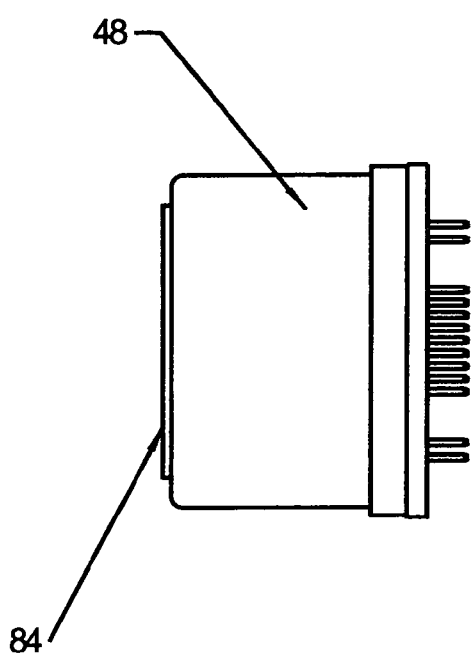
FIG. 7B depicting in side elevational view the UFPA detector used in the present invention.

As noted above, the detector 48 is an un-cooled focal plane array (UFPA) having an active pixel array of 320×240. It can be purchased from DRS, Inc. of Morristown, N.J.— their model number U3000AR. It is based on Vox (Vanadium oxide) microbolometer technology or amorphous silicon (a-Si) technology. These detectors are packaged in a rugged, miniaturized assembly that incorporates a spectral transmission infrared window 84 as shown in FIG. 7B.

However, since most of desired usages for these devices involved night vision situations, with a typical background ambient temperature of 300K, or other low temperature applications, the detector was optimized to work in the spectral band of 8 to 14 um. In such applications, the peak infrared radiation takes place at about 10 um. This is exactly in the middle of detector sensitivity and detector window spectral transmission. Since the spectral transmission band of 8 to 14 has an extra benefit of being substantially transparent to atmospheric absorptions, this makes this spectral band one of the most used in infrared thermometry and thermal imaging.

The present invention, however, uses a window 84 that is spectrally coated for the very broad band of 3 to 14 um instead of the conventional window in these detectors with a spectral band of 8 to 14 um. As such, the detector can be used for the dual purposes envisioned by the invention: 8 to 14 um for low temperature thermal imaging; and 3 to 8 um for specialized high temperature thermal imaging, all within the same unit. The interior of the detector is vacuum-sealed for maximum sensitivity of sensing elements in the detector sensitive area 86 (FIG. 7A).

Returning to FIG. 5, the shutter 88 is a mechanical flag that operates either by a command from the operator, or automatically, to periodically shield the incoming infrared radiation from the target. This time period may last from a fraction of a second to a few seconds. Since the temperature of the shutter is uniform by the virtue of the design, and also is known due to the placement of a suitable temperature sensor, not shown, this becomes a way to do a quick test of the integrity of the detector. Also, the non-uniformity of each individual pixel of the detector is tested and all off-sets associated with drifts can be eliminated. During the time the shutter is closed, the instrument, of course, is "blind" and not taking any images.

The motor 90 actuates the shutter 88 to block momentarily incoming radiation from the target.

The housing 12 is the same as used with Mikron's standard thermal imager models, # 7102, 7200V and 7515. It is a precision die cast, made from aluminum by an injected molding process.

Figure 9A:
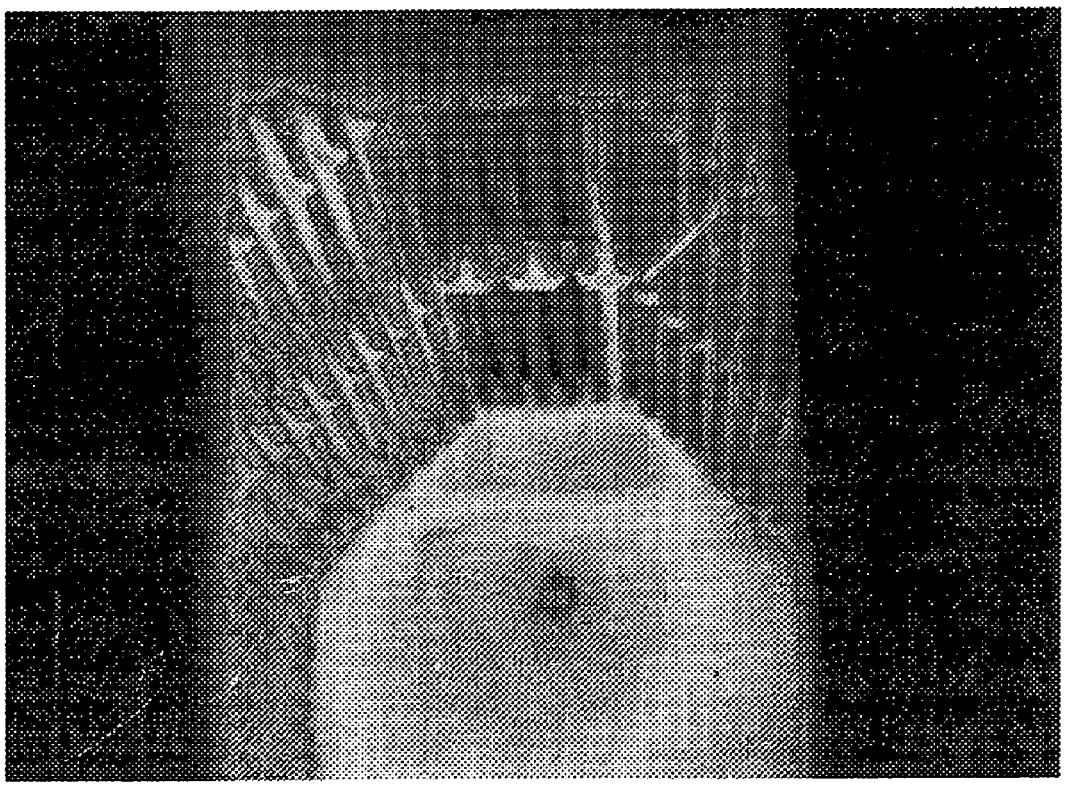
FIG. 9A showing the thermal image of the interior of a coker furnace in a refinery, as viewed through the viewfinder of the instrument of the present invention.
Figure 9B:
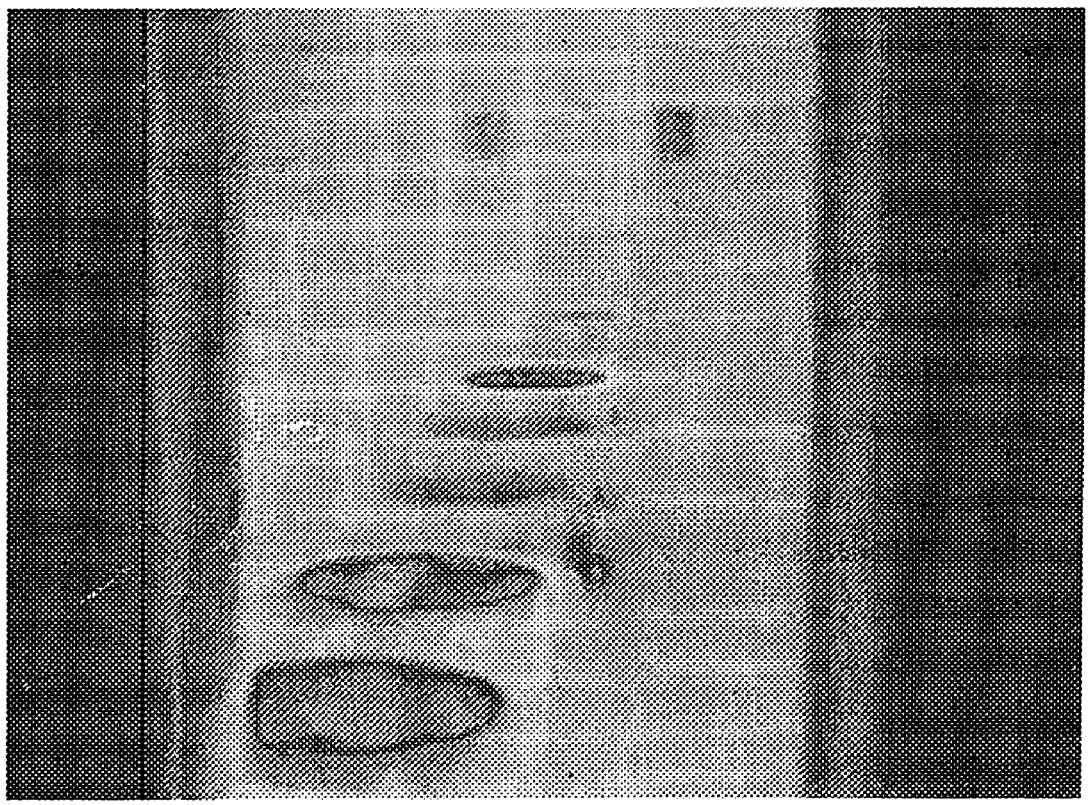
FIG. 9B showing the thermal image of the burner bank on the floor of a coker furnace as viewed through the viewfinder of the instrument of the present invention.
Figure 9C:
FIG. 9C showing a visual image of the same burner bank shown in FIG. 9B, which depicts the hot combustion gases (flame) highlighting the effectiveness of the apparatus of the present invention.
Figure 10:
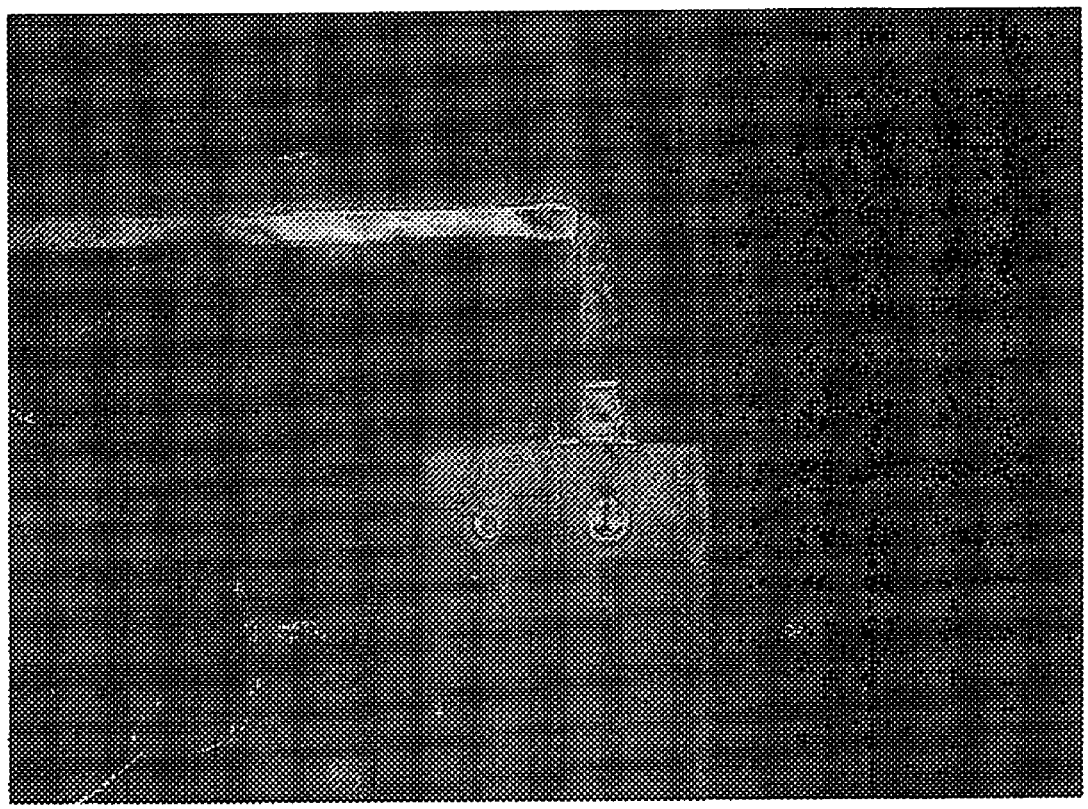
FIG. 10 showing an image of a typical house hot water heater illustrating the low temperature applications of the present invention, again with the clarity of the thermal image attesting to the superior design of the present invention and its adaptability for dual purposes.

The viewfinder 70 is the same as used on Mikron's models, # 7102, 7200V and 7515 and is used for seeing thermal images in indoor or outdoor environments, such as FIGS. 9A and 9B (both with filter 80 in place) and 10 (with filter 78 placed in the optical path). FIG. 9C is an image taken with visible spectrum of a built-in CCD camera inside the thermal imager.

The electronics 92 is substantially the same as that used in Mikron's thermal imager models, # 7102, 7200V and 7515. However, some changes in the firmware allows for the selection of the different temperature ranges required by the invention, positioning of infrared filters, and includes different menu selections. The electronics includes a new algorithm for high temperature range with the ability to cancel the influence of background radiation, as discussed hereinafter. The battery 94 is a high capacity lithium ion rechargeable battery, and is also the same type as used in thermal imager models # 7102, 7200V, and 7515.

A thermal imager for the purposes of this embodiment is a modified version of Mikron's model # 7200V. It is a radiometer calibrated to indicate correctly the temperature of a blackbody source. The procedure to obtain the temperature of the blackbody, from the spectral radiance $W_{\lambda,T}$ (watts per um$^2$) reaching one pixel of the thermal imager, involves only the use of Planck's law. It is stated as follows:

$$W_{\lambda T}(\lambda_{\text{eff}}, T) = C_1 \lambda^{-5} \left( e^{\frac{-C_2}{\lambda_{\text{eff}} T}} - 1 \right),$$

where $\lambda_{\text{eff}}$ is the effective wavelength of the thermal imager, i.e., 3.90 um, $C_1$ and $C_2$ are constants with values of $3.741 \times 10^{-4}$ watts um$^2$ and 14388 um degree respectively; and, T is the temperature of the blackbody expressed in K. For this rare situation, i.e. where the measurement is done against a blackbody source, the obtaining of temperature from spectral radiance is directly made and no corrections are necessary.

Figure 1:
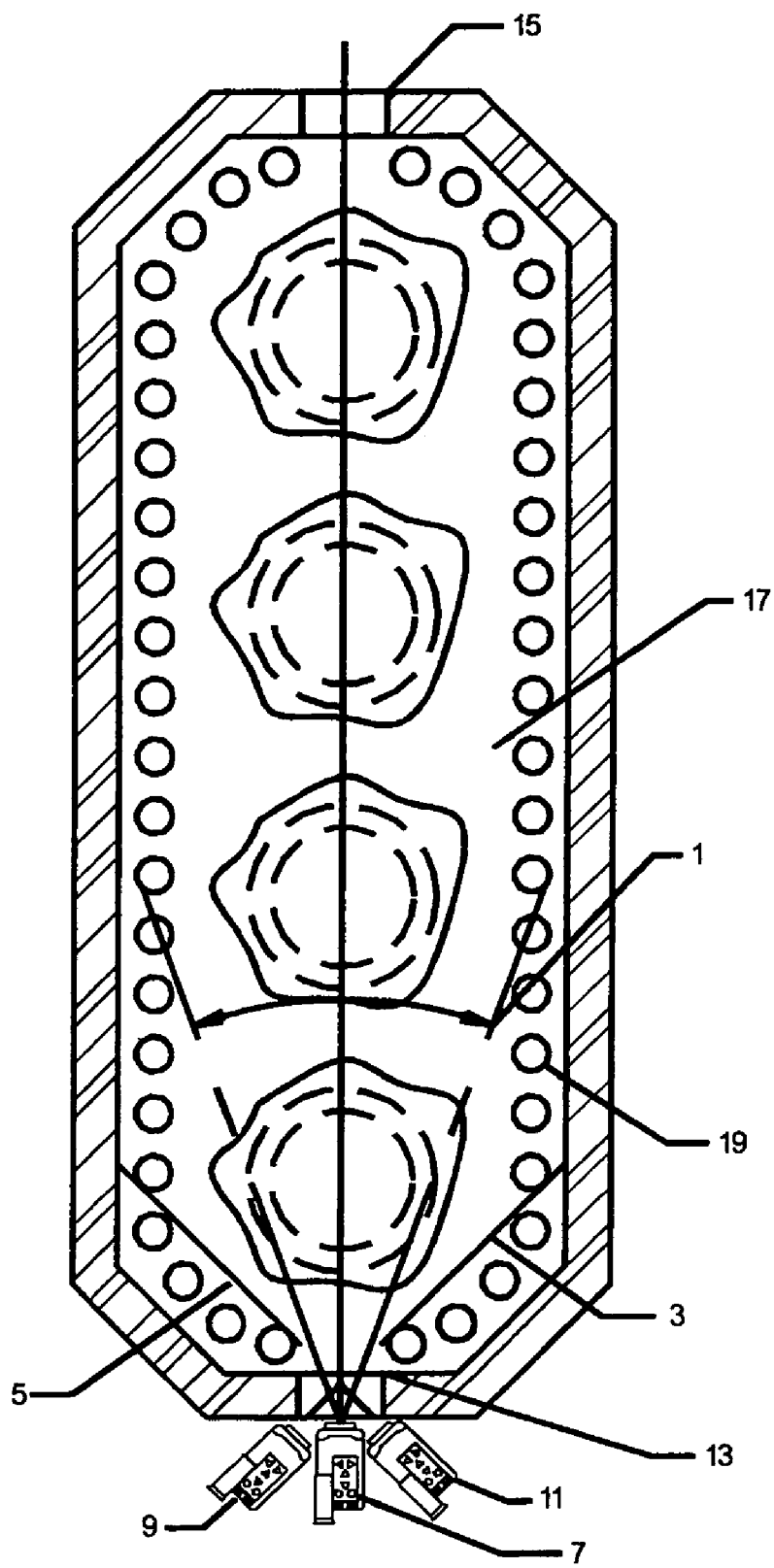
FIG. 1 depicting in a plan, functional view, a typical coker furnace in a refinery.

In a typical application for purposes of this invention, however, where the thermal imager is viewing a large area of a furnace interior within its field of view (see FIG. 1) an image of incoming spectral radiance $W(\lambda,T)$ impinging on a single pixel is created by the UFPA detector 48, which is comprised of several radiation components. Determining the actual tube wall temperature from an indicated apparent temperature is difficult.

Figure 8:
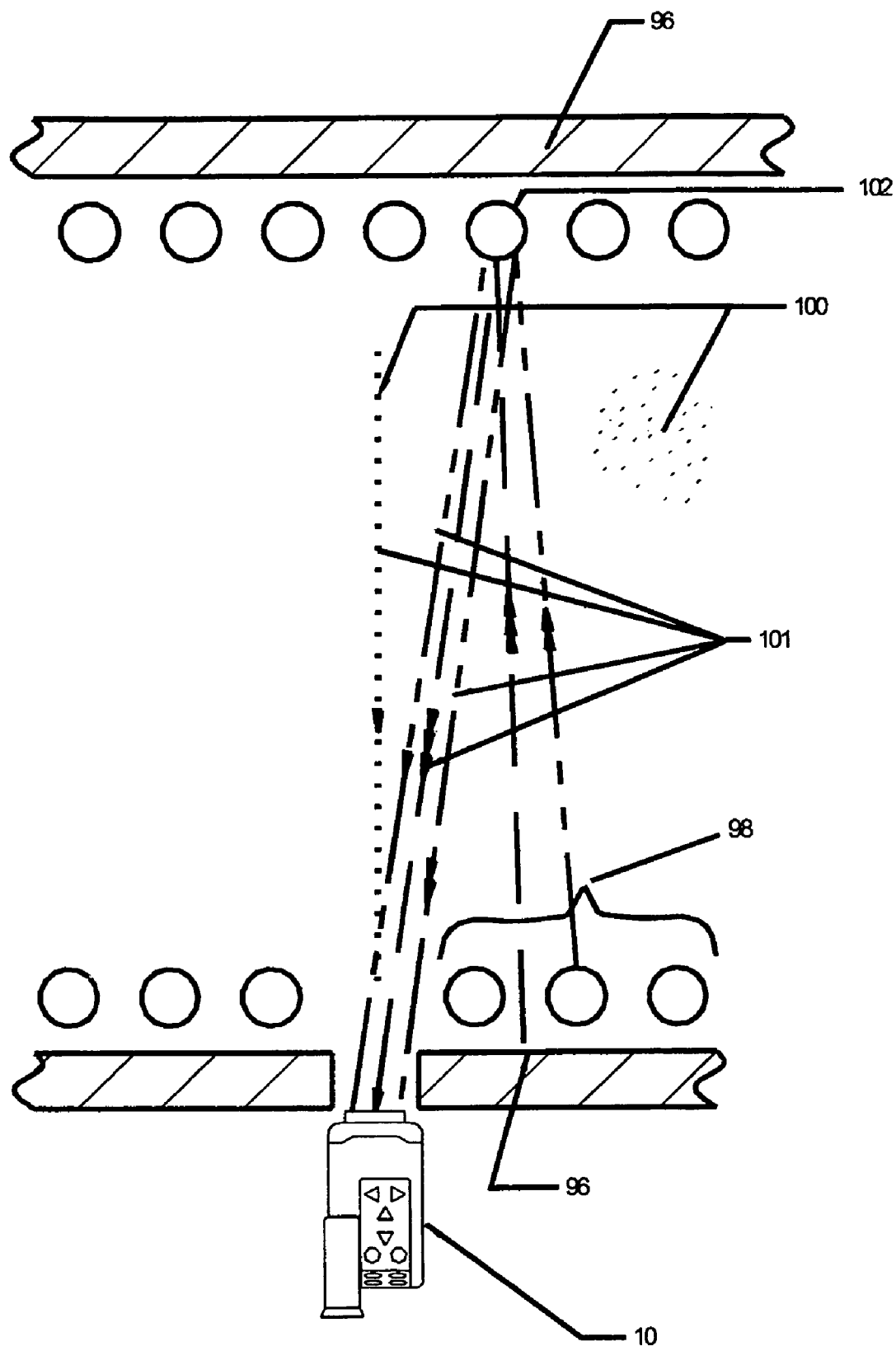
FIG. 8 depicting in a partial, plan functional view, the various components comprising the total incoming radiation to a thermal imager positioned at a viewport.

Consider the situation depicted in FIG. 8. FIG. 8 shows schematically, incoming radiation to the thermal imager from different sources including the unwanted radiation from the surrounding background including radiation from hot combustion gases.

The tube surroundings are comprised of a refractory wall 96, with a temperature of $T_w$; opposite side tube banks 98 with a temperature of $T_{bt}$; and hot combustion gases 100 (shown by several dots in FIG. 8) with a temperature of $T_g$. With IF filter 80 in place in the imager's optical path, irradiance originating from the surroundings incident on a furnace tube is reflected into the instantaneous field of view (IFOV) of the imager or a single element (pixel) of the detector 48 at a narrow pass spectral band of 3.90 um. Therefore the total spectral radiance sensed by one pixel of the UFPA detector 48, which we will define as $W_a(\lambda, T_a)$ 101 (see FIG. 8), is the sum of the radiance due to emission from the various sources and the reflection from the tube (see equation 2) and is expressed by the following equation #1, $$W_a(T_a) = t_g\{e_t W_t(T_t) + W_r(T_{bg})\} + e_g W_g(T_g),$$

where: $W_a(T_a)$ is the total energy received within the IFOV of a single pixel of the imager detector 48 producing an apparent temperature of $T_a$ for tube 102; $W_t(T_t)$ is the equivalent radiated energy from a tube at a tube temperature of $T_t$, and having an emissivity of 1.0; $W_r(T_{bg})$ is the total reflected energy received due to the background influence of the surrounding tube bank, 98, refractory walls 96 and hot combustion gases 100; $W_g(T_g)$ is the total radiance energy from the hot combustion gases at gas temperature of $T_g$; $t_g$ is the transmission coefficient of the hot combustion gases; $e_t$ is the emissivity of the wall tubes; $e_g$ is the emissivity of the hot combustion gases, i.e., $(1-t_g)$; and $e_w$ is the emissivity of the refractory wall.

The total spectral reflected energy from a tube is expressed by the following equation 2 as follows:

$$W_r(T_{bg}) = (1-e_t)[F_{t,bt} e_t W_{bt}(T_{bt}) + G_{w,t} e_w W_w(T_w) + K_{g,t} e_g W_g(T_w) + K_{g,t} e_g W_g(T_g)],$$

where $W_{bt}(T_{bt})$ and $W_w(T_w)$ are energy levels emitted by the background tube banks 98 and refractory walls 96 and $W_g(T_g)$ is an energy level, at an effective length, of the hot combustion gases, all at their respective temperatures; and $e_w$ is the emissivity of the refractory wall.

$F_{t,bt}$, $G_{w,t}$ and $K_{g,t}$ are what could be called view factor coefficients. These attempt to provide a weighing of each contributing element of the surrounding background. They vary between 0.0 to 1.0 depending principally on the geometry of the furnace and view port location with respect to the exact location of the measurement area of IFOV of the detector.

Equations 1 and 2 are considered generalized measurement equations, since the parameters of the equations are different from pixel to pixel. An intimate knowledge of geometry of the furnace, background temperatures and view factors, from spot to spot, fuel transmission and emissivity for different fuel types, and dependency of the tube emissivity with angle should be available, in order to obtain the final tube, true temperature.

By way of illustration consider the following example with the following initial assumptions:

true temperature of tube, $T_t$, is 1173K or 900° C. (104 in FIG. 11B);
background refractory wall temperature, $T_w$, is 1373K or 1100° C. (106 in FIG. 11B);
combustion gases temperature, $T_g$, is 1973K or 1700° C. (108 in FIG. 11B);
emissivity of tube, $e_t$ is 0.88;
emissivity of refractory wall, $e_w$ is 0.90;
emissivity coefficient of combustion gases, $e_g$ is 0.004/(meter of gas depth) at 3.90 um (see FIG. 2A); and, the optical transmission coefficient of combustion gases, $t_g$, i.e., $(1-e_g)$, is 0.996/(1.0 meter of gas depth) and for 5.0 meters of gas depth is $(1.0-5.0\times0.004)=0.98$, at 3.90 um; and, the view factor coefficients $F_{b,t}$, $G_{w,t}$ and $K_{g,t}$ are respectively assigned the values 0.90, 0.10 and 1.0.

Values for $W_{bt}(T_{bt})$, $W_w(T_w)$ and $W_g(T_g)$ are determined from Table 1 (FIGS. 11A, 11B,) for the associated, assumed temperatures (104, 106, 108). Table 1 is a conversion table reflecting the relationship between radiance energy and temperature. It is generated by integrating Planck's Law over the interval of 3.8 um to 4.0 um, which corresponds to the spectral bandwidth of the infrared filter 80. It is further assumed that the central pixel of the thermal imager has a distance, or gas depth, of 5.0 meters from the tube.

Inserting these assumed numbers in equation 2 and solving for $W_r(T_{bg})$, the total spectral reflected energy from tube 102 in FIG. 8 is, or, $W_r(T_{bg}) = (1-0.88)[0.90\times0.88\times0.37353+0.10\times 0.90\times0.60653+1.0\times(0.004)\times(5.0m)\times 1.5134] W_r(T_{bg}) = 0.04568.$ The addition of this reflected energy would result in an apparent, higher reading than the actual temperature.

Now solving equation 1, the total spectral radiance received by the instrument becomes, $W_a(T_a) = 0.98\{0.88\times0.37353+0.04568\}+0.004\times5.0\times 1.5134 = 0.39717$ Referring to Table 2 (FIG. 12), the apparent temperature, $T_a$, 110 would be approximately 923° C., or about 23° C. above actual temperature with an instrument emissivity setting at 1.0; and the influence of the background is not cancelled. At emissivity setting of 0.88 for the tube the temperature would appear to be 971° C., about 71° C. above actual temperature.

However, if you subtract the amount of reflected energy of the tube, $W_r(T_{bg}) = 0.04568$ radiated energy of the hot combustion gases and adjust for the transmission through hot combustion gases from 0.98 to 1.0 the total energy that would be used for calculation instead would be, $$W_a T_a = 1.0\{0.88 \times 0.37353 + 0.04568 - 0.04568\} +$$
$$0.004 \times 5.0 \times 1.5134 - (0.004) \times (5.0m) \times 1.5134$$
$$= 0.3287$$

At an emissivity setting of 0.88 for the wall tube 102, the total energy used for the calculation of the actual tube temperature is, $$W_t(T_t) = W_a(T_a) + e_t$$

Using table 1, FIGS. 11A, 11B and 11C, $W_t(T_{bg}) = 0.32871 + 0.88 = 0.37353.$ This corresponds to 900° C., 104, using table 1, indicating no temperature error.

CONCLUSION

As shown in the above illustrations, with a sophisticated algorithm that includes all components of radiation from the interior of the furnace reaching the thermal imager, one by one, each of the unwanted components of the incoming energy can be accounted for and subtracted by the use of a proper algorithm, in order to achieve absolute temperature readings. In actual practice the user can ignore some of the less important components of unwanted incoming energy and still be able to get accurate readings.

In some less critical process applications, the user would be satisfied with monitoring the apparent temperature vs. time to insure that no hot spot is developing so that they may not be overly concerned with wall tube, absolute temperature readings. In other situations the user may prefer to use a weighted average of unwanted incoming energy instead of individual components.

The above equations 1 and 2 are a generalized measurement equations ready to address all circumstances.

A simplified version of above relationship can be expressed if we assume the coefficient view factors are constant and do not depend on the geometry of the furnace design or location of the view port used by the thermal imager. For example, $F_{t,bt}=0.90$, $G_{w,t}=0.10$ and $K_{g,t}=0.0$ for all furnace areas regardless of the position of the thermal imager with respect to the measurement areas. This is the condition where a percentage of the background refractory walls seen by the thermal imager is very small. Consequently, most of the reflected energy is from background tube banks that are nearly the same temperature as the bank of tubes within the FOV of the instrument. In addition for a very effective infrared filter the reflected energy of the view factor $K_{g,t}$ of hot combustion gases can also be ignored and thus is assumed to be equal to 0.0.

Implicit in this analysis is an assumption that the surrounding background can be approximated as two different blackbodies at two different temperatures, and that the surfaces are diffuse and follow Lambert's law. One blackbody represents wall tubes of the opposite side and the other blackbody represents the opposite refractory walls. These are reasonable assumptions for analysis and actual practice, which attempts to demonstrate the magnitude of the effect of various furnace conditions on the apparent indicated temperature, $T_a$. With these assumptions, the equations 1 and 2 can be rewritten as, $$W_a(T_a)=t_g\{e_t W_t(T_1)+W_r(T_{bg})\}+e_g W_g(T_g), \quad \text{Equation 3;}$$

and, $$W_r(T_{bg})=(1-e_t)[FW_{bt}(T_{bt})+GW_w(T_w)], \quad \text{Equation 4.}$$

The equations 3 and 4 can be considered as simplified measurement equations, which could be programmed into the instrument's firmware. The operator can easily input the parameters such as tube emissivity, view factors for the background tube bank and refractory wall, and hot combustion gases' emissivity depending on the fuel type, and average distance measurements.

Solving the two equations, 3 and 4, to obtain the apparent temperature, $T_a$, using the assumed numbers from the previous illustration, $$W_r(T_{bg})=(1-0.88)[0.90\times 0.37353+0.10\times 0.73876]=0.04437$$

$$W_a(T_a)=0.98\{0.88\times 0.37353+0.04437+0.01513\}=0.38821$$

Referring to Table 2, the apparent temperature using the simplified equations 3 and 4, is $T_a \approx 914°$ C., about 14° C. above the actual temperature of tube when the emissitivity setting is placed at 1.0 and cancellation of background irradiance is made.

The present invention provides a new thermal imager design having a UFPA detector which includes a new, spectral transmission window which allows the incoming radiation from a given target reaching the sensitive elements (pixels) of the detector to include the radiation spectrum from 3 to 14 um. The invention allows for the placement of a narrow pass band infrared filter centered at a particular wavelength in the range generally between 3 to 8 um, in front of the detector window only when the requirement for the thermal imager is for high temperature thermal imaging and temperature profiling through an absorptive media such as combustion gases. The transparency of this media will only take place at a narrow band wavelength centered at 3.9 um. A specially designed mechanism adaptable for use in the Mikron thermal imager model 7200V allows for automatic placement of this infrared filter in or out of the optical path by the operator. The design of the optical lens assembly and its infrared coating is optimized, in a standard thermal imager, for example, the Mikron 7200V, a 4 element germanium lens assembly is optimized for acceptance of the much wider spectrum of radiation. Instead of the traditional 8 to 14 um, it is optimized for the range from 3 to 14 um.

By incorporating these novel design changes, a standard thermal imager, for example, Mikron's model 7200V series, is enhanced so as to produce a new class of infrared thermal imagers with the following features heretofore unavailable to industrial users in a single device.

1. A thermal imager using an un-cooled focal plane array (UFPA) detector, which is able to see through an absorptive media such as hot combustion gases by using an appropriately centered, infrared narrow pass band filter.
2. In other ranges of the instrument which cover the temperature range of −40 to 500° C., an 8 to 14 um filter is interposed in the optical path, allowing the lower temperature measurements associated with conventional, predictive preventive maintenance (PPM).
3. For outdoors PPM applications during day time, when the sun is present, the long wave pass band of 8 to 14 um blocks the reflected unwanted radiation of sun light ensuring accurate thermal images.

Firmware inside the instrument allows for the collection of images either with a flash card or directly by a PC. Mikron custom off-line MikroSpec™ software, available from Mikron for use with its thermal imagers, may be used for a comprehensive image manipulation, trend analysis and maintenance scheduling and report generation, for management review and simplifies this difficult measurement. This novel method provides higher absolute accuracy of tube temperature within the field of view of the instrument, pixel by pixel. The simplified fashion of assuming a hot uniform background temperature and cancelling its effect, as presently done, may not create the desired accuracy. The firmware inside the instrument combined with MikroSpec™, off-line software has the ability to predict and cancel the effects of unwanted incoming radiance toward the thermal imager, pixel by pixel, in order to infer the true temperature of tubes at every point based on apparent temperature measurements. The novel method of the present invention relies on a more comprehensive understanding of the background radiation influence and provides for its cancellation.

Through innovative and novel design changes to a standard thermal imager such as Mikron's Model 7200V a new class of thermal imagers can be designed that has the ability to perform dual functions This new model has a temperature span of −40 to 2000° C. It satisfies the existing dominant market requirements for PPM applications with a temperature span of −40 to 500° C., including during the day with sunlight present. In addition, it allows industrial users with large furnaces such as petrochemical companies and utility power plants, to thermally profile their furnaces conveniently and safely at higher temperatures up to 2,000° C.

Further, the innovative design allows the use of a standard thermal imager such as Mikron's Model 7200V for other purposes, for example, monitoring the seal temperature between the glass envelope and metal end cap during the fabrication of fluorescent light bulbs. In this application since the process is accomplished in the presence of flame, the use of a filter having a band width of 3.8 to 4.0 um allows the instrument to see through the flame to detect the temperature at the seal-point, to assure its sufficiency.

So, too in the manufacture of plastic bags of certain plastics, it is important to detect the temperature of the process as the bags are being formed so as to assure the integrity of the bag. Here it is found that a second filter having a band width of 6.7 um to 6.9 um will allow the thermal imager to accurately read the surface temperature of the targeted plastic since certain plastics are only absorptive in this range, once again assuring the consistency in temperature necessary to produce a quality product.

A still further application calls for the use of a second filter having a band width of 4.8 to 5.2 um. Here the utility of the modified imager is directed to the fabrication of tempered glass, such as used in car windshields. This filter allows for the monitoring of the temperature across the glass product at its absorptive wavelength assuring the necessary uniformity required to achieve a satisfactory product.

In all cases, the use of a second filter allows for an expansion of the standard imager's capabilities making it an attractive, cost-effective alternative to present approaches.

Other variations on the embodiments described herein will be apparent. Of course, the breadth of the present invention is not to be construed as limited to that disclosed heretofore but rather dictated by the scope of the claims which follow.

What is claimed is:

1. A method for enhancing the capabilities of a portable, hand-held lightweight thermal imaging instrument, so as to permit the thermal imaging of target surface(s) having lower temperatures typically in a first range between −40° C. and 500° C. or, alternately, but not contemporaneously, of target surface(s) having higher temperatures typically in the range between 400° C. and 2000° C., so that the actual true temperature of the target surface(s) within an acceptable degree of accuracy can be made, the thermal imaging at least in the higher temperature range accruing in an environment where there is the presence of unwanted radiation from the surrounding background, including at least a first source of unwanted radiation, said unwanted radiation adversely affecting the determination of the actual true temperature, the target surface having a known absorptive wavelength, the thermal imaging taking place through intervening media having a known transmission wavelength, the instrument including a housing (12) having an opening (14) for admitting infrared rays including those emanating from said target surface(s), said rays directed along an optical path within said housing, said optical path having an optical axis (38), an optical assembly (40) positioned within said housing and in said optical path, said optical assembly having an input and an output, said infrared rays directed towards and into said input, through and out of said output of said optical assembly, said optical assembly including an objective lens (74), a negative lens (76), and focusing lens means (18, 82, 84), an un-cooled focal plane array, infrared ray detector(UFPA detector) (48) including a detecting surface (86), said UFPA detector positioned in said housing and in said optical path so as to allow the impingement of the infrared rays passing out of said optical assembly onto said detecting surface, said UFPA detector further including a spectral transmission window (84) positioned in said optical path between said output and said detecting surface, said UFPA detector providing an electrical output proportional to the energy of the infrared rays impinging onto said detecting surface, the method comprising the steps of:

(a) disposing and coaxially aligning each of said lenses along said optical axis;

(b) employing germanium lenses with an anti-reflection coating having a spectral band width of 3 um to 14 um for each of said lenses forming said optical assembly;

(c) employing a spectral transmission window that has a spectral band width of 3 um to 14 um for said spectral window associated with said UFPA;

(d) employing an infrared filtering means (44) including a first (78) and second (80) infrared band pass filter, said first infrared band pass filter having a pass band centered at a wavelength in the bandwidth of 8 to 14 um, said second infrared band pass filter having a pass band centered at a wavelength in the bandwidth of 3 to 8 um, said pass band of at least said second band pass filter having a spectral bandwidth of approximately 0.2 um, the respective center wavelength of said pass band of at least said second infrared band pass filter approximating the known transmission wavelength of the intervening media and/or the absorptive wavelength range of the targeted surface;

(e) providing means on said instrument to be activated by an operator whereby one or the other of said band pass filters is interposed in said optical path depending on the temperature range of the target surface, said first infrared band pass filter interposed when the temperature of the target surface(s) is in the first range, said second infrared band pass filter interposed when the temperature of the target surface(s) is in the second range;

(f) providing electronic means responsive to said electrical output of said UFPA including programming said electronic means with at least respective algorithms, relevant constants and emissivities for processing said electrical output of said UFPA detector so as to calculate the temperature of the targeted surface, whether the targeted surface has a temperature in the first range between −40° C. and 500° C., or alternately has a temperature in the second range between 400° C. and 2000° C., said electronic means providing at least one interpretable output (26, 28, 30, 32, 72) whereby the operator is presented with information sufficient to determine the actual true temperature(s) of the target surface(s) within an acceptable degree of accuracy, the step of programming said electronic means including storing data relevant to the environment and to a determination of the actual true temperature, and further including programming a sufficient number of data processing steps wherein the adverse effect of said unwanted radiation on the determination of the actual true temperature is substantially minimized.

2. The method claimed in claim 1 wherein a second infrared band pass filter is selected wherein said spectral bandwidth is centered at approximately 3.9 um wavelength.

3. The method claimed in claim 1 wherein a second infrared band pass filter is selected wherein said spectral bandwidth is centered at approximately 5.0 um wavelength.

4. The method claimed in claim 1 wherein a second infrared band pass filter is selected wherein said spectral bandwidth is centered at approximately 6.8 um wavelength.

5. The method claimed in claim 2 wherein the environment for the high temperature range is the interior of a refractory furnace having a known geometry and having a plurality of boiler tubes, where the target surface is the surface of one of said plurality of boiler tubes, the target surface being viewed by said instrument through at least one of a successive number of view ports, and wherein the sources of unwanted radiation include the hot combustion gases, at least one wall of the refractory furnace and at least one boiler tube other than the one having the target surface, and wherein part of the data to be stored relevant to the environment includes a view-factor coefficient for each of said at least one of a successive number of view ports.

* * * * *